United States Patent [19]

Kurtik

[11] 3,996,596
[45] Dec. 7, 1976

[54] REPRODUCTION APPARATUS

[75] Inventor: Ryan R. Kurtik, Herlev, Denmark

[73] Assignee: Océ-van der Grinten N.V., Venlo, Netherlands

[22] Filed: June 17, 1975

[21] Appl. No.: 587,537

[30] Foreign Application Priority Data

June 28, 1974 Netherlands .................... 7408751

[52] U.S. Cl. .............................. 354/197; 354/286; 355/55
[51] Int. Cl.² ..................... G03B 3/00; G03B 13/02
[58] Field of Search ......................... 354/195–198, 354/202, 286; 355/55, 56; 352/142; 350/254

[56] References Cited

UNITED STATES PATENTS

| 3,388,650 | 6/1968 | Westphalen | 354/197 X |
| 3,625,607 | 12/1971 | Bravenec | 355/56 |
| 3,779,642 | 12/1973 | Ogawa et al. | 355/56 X |
| 3,832,058 | 8/1974 | Gusovius | 354/198 X |

Primary Examiner—John Gonzales
Attorney, Agent, or Firm—Albert C. Johnston

[57] ABSTRACT

Reproduction apparatus with at least two objectives in a movable holder and an adjustable diaphragm. The holder and the diaphragm are provided with signal initiators which activate detectors in dependance on the position of the holder respectively the adjustment of the diaphragm.

2 Claims, 3 Drawing Figures

REPRODUCTION APPARATUS

The invention relates to a reproduction apparatus which is provided with at least two objectives, mounted on or in a holder, which objectives are provided with an organ for the adjustment of the diaphragm aperture, and of which the holder can be displaced laterally and along the optical axis of the reproduction apparatus, respectively to select one of the objectives for the imagewise exposure of the light-sensitive material, and to bring the position of the selected objective in correspondence with the required reproduction factor.

Such reproduction apparatus, with which for instance enlargement apparatus and repro-cameras are meant, are known. In such apparatus one of the reasons why holders containing more objectives are used, is that the range within which the reproduction factor can be varied, is enlarged. In this case reproduction factor stands for enlargement and reduction factor. In many cases the displacement of the objectives along the optical axis of the apparatus is mechanically coupled to the distance between original and image-plane, so that it is possible to carry out the selection of the reproduction factor and the sharpness-adjustment in one manipulation. An objection of such a coupling is that for each objective in the holder a special coupling is necessary and that it is not possible without more to replace an objective in the holder. As the real focal length of an objective can deviate quite much from the nominal focal length, it would be useful for obtaining exact coupling to reconstruct or replace also the coupling. This problem can be prevented by the application of an electronic coupling, with which it is possible to adapt the coupling to the optical data of the objective applied by replacement of one or more elements, such as diodes or resistors in the electronic circuit. Thus the specification of Swiss patent 542,458 describes a reproduction apparatus, with which the holder of the objective applied contains a resistor serving to adapt the electronic circuit to the optical data of the objective. When an other objective is selected, the holder with objective is replaced by an other combination containing the corresponding resistor. Such a system has the disadvantage, that it is necessary to work with loose holders. In principle also a number of objectives with pertaining resistors could be taken up in a holder which is laterally movable with regard to the optical axis, although this is not described in the specification of the Swiss patent mentioned. However, the objection of this construction is, that slide contacts must be used which can give rise to all kinds of troubles because of wear and pollution.

The object of the invention is to eliminate these disadvantages and also to provide for means which make it possible to programme an automatic exposer or shutter with the adjusted diaphragm aperture of the selected objective, without again introducing the disadvantages of slide contacts and similar.

This is reached according to the invention, in that in a reproduction apparatus, as meant in the first paragraph, the holder and the organs for the adjustment of the diaphragm are provided with one or more signal initiators and near the holder an element is mounted, which can only be displaced along the optical axis together with the holder, and is provided with two series of detectors, whereby dependent on the objective selected, one of the detectors out of the one series reacts to a signal initiator on the holder, and dependent on the diaphragm aperture selected, one of the detectors out of the other series reacts to a signal initiator of the corresponding organ for the adjustment of the diaphragm aperture.

According to a preferred embodiment the signal initiators are magnets and the detectors are Reed-contacts which can be caused to react to the magnets. A combination of microswitches and cams, which can operate the microswitches, or a combination of photoconductive detectors, consisting of a photoconductive element and a small lamp, and reflecting spots on which the photoconductive detectors can react, can also be applied.

The element may consist of a small plate of an electrically insulating material, on which the two series of detectors and a printed circuit are installed. The number of detectors of the one series is equal to the number of objectives that can be installed in the holder. The number of detectors of the second series is equal to the number of diaphragm apertures which the proper objective allows to be adjusted, or the number of diaphragm apertures which one desires to use.

The holder for the objectives can have a shape which is known for such holders. The basis shape can for instance be a rectangular plate which by means of a carriage can be shoven in lateral direction with regard to the optical axis of the reproduction apparatus for the selection of the objective desired.

The holder can also have the shape of a circle-segment, which can rotate round a fixed point. The holder is provided with one or more signal initiators. A single signal initiator which reacts to the detector corresponding with the objective selected, is sufficient but dependent on the shape of holder and element it is possible that the signal initiator would have to be mounted on a place where this disturbs the detectors for the diaphragm adjustment. By applying more signal initiators a more favourable place for these initiators can be chosen.

The organ for the adjustment of the diaphragm aperture generally is an adjustment-ring or an adjustment-pin on which a signal initiator is mounted directly or via a lengthening arm.

The detectors which react on the position of the holder, can be connected with an electronic device, and can switch on or off elements in this device, in order to adapt the unit to the optical data of the objective, such as the focal length and the distance between the work planes. Such an electronic device can for instance registrate the distance from the objective to the image-plane, can calculate the reproduction factor and can compare the distance mentioned with the distance between the object-plane and the image-plane, which distance has also been registrated. By for instance varying the distance from the objective to the image-plane by hand, the reproduction factor can be adjusted and read off. The distance between the object-plane and the image-plane is automatically adapted via a servomotor, until the distances meet the general lens formula. With a variation of such an electronic device the distance between object-plane and image-plane is also adapted by hand, whereby the electronic device indicates via a signal, if the general lens formula is complied with.

The detectors which are caused to react to the position of the signal initiator on the organ for the diaphragm adjustment, can be connected to a lightmeter, a time clock or shutter, and can programme such instruments along this way with the diaphragm aperture adjusted.

The invention will be further explained by means of the enclosed figures.

Figure 1:
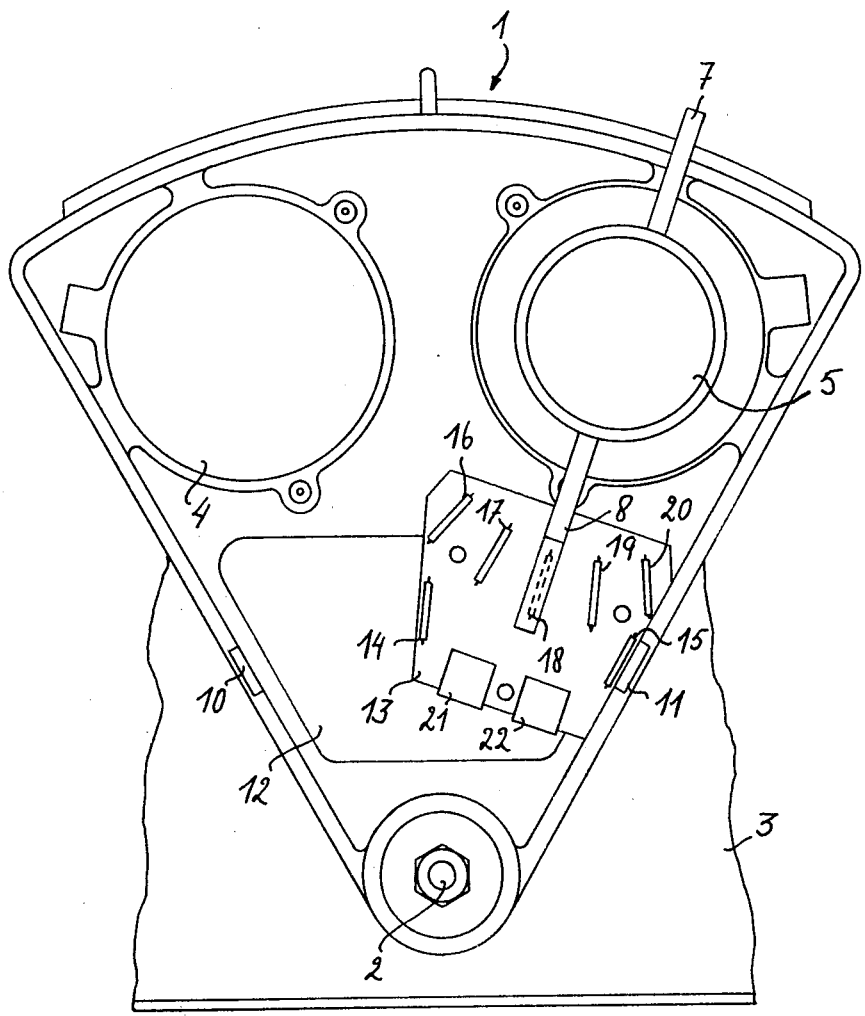
FIG. 1 is a lower view of a holder with element as applied in a reproduction apparatus according to the invention.
Figure 2:
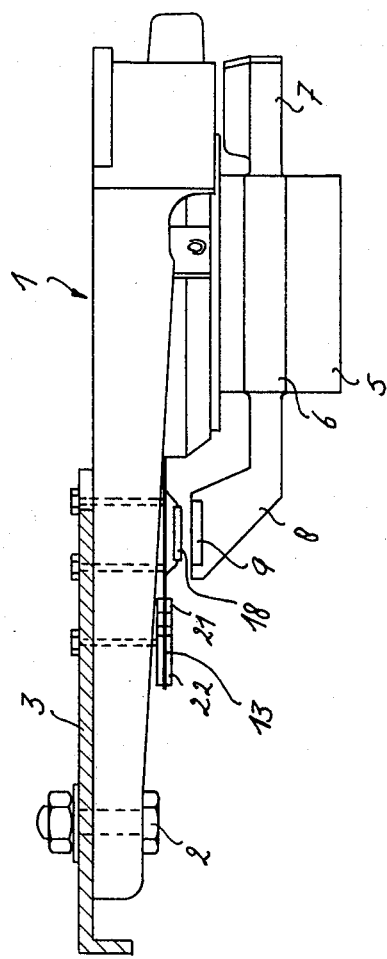
FIG. 2 is a side view of the device represented in FIG. 1.
Figure 3:
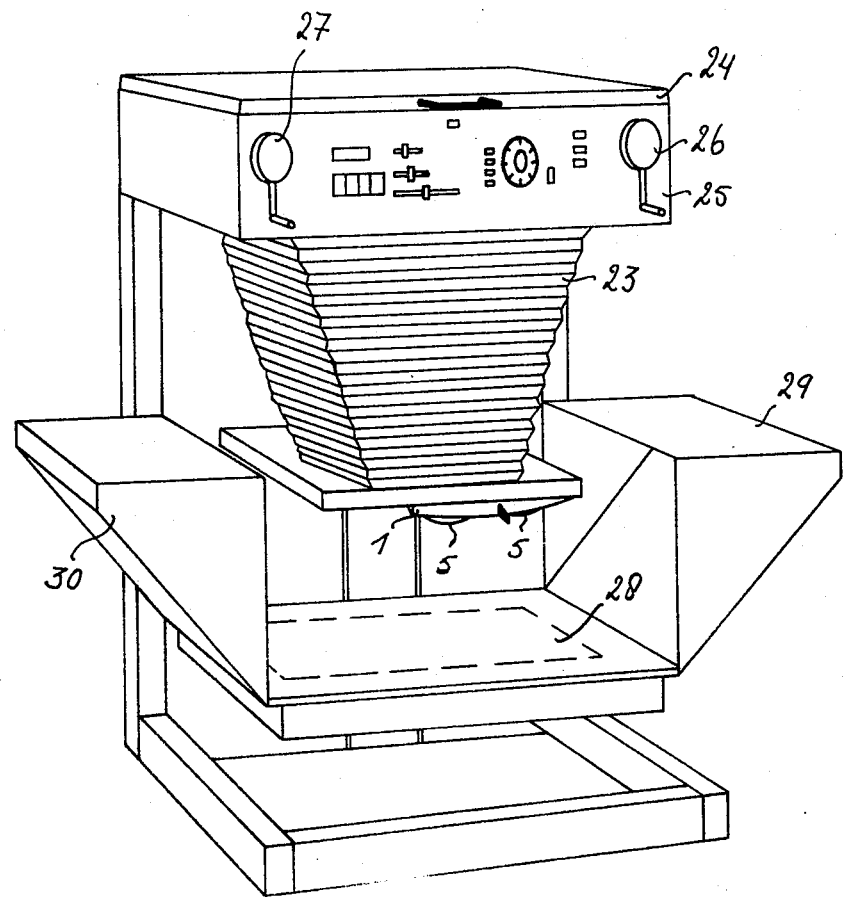
FIG. 3 is a reproduction apparatus which is provided with a holder and element, as represented in FIGS. 1 and 2.

In FIG. 1 and 2 the holder 1 is rotatably mounted on a supporting plate 3 by means of a distance bolt 2. The holder is provided with openings 4 in which the objectives 5 with diaphragm ring 6 are mounted. To be clear one of the objectives has not been represented. The diaphragm ring 6 is provided with an adjusting pin 7 and a lengthening arm 8, to which the magnet 9 is fixed. The holder is further provided with the magnets 10 and 11 and an opening 12, which makes it possible to install the element 13 on the supporting plate 3. The element 13 consists of an electrically insulating plastic plate, which is provided with a non-represented wiring, the Reed-contacts 14 and 15 which can be caused to react respectively to the magents 10 and 11, the Reed-contacts 16 up to and including 20, which can be caused to react to the magnet 9 and the magnet of the objective which is not represented, and two connection plugs 21 and 22 with which the non-represented wiring on the element 13 can be connected to a non-represented electronic device. In FIG. 3 the holder 1 with the objectives 5 is visible below the bellows 23 of a reproduction apparatus according to the invention, which below the cover 24 is provided with a glass plate for the light-sensitive material, and further contains a panel 25 which is provided with the usual means for reading off the various magnitudes and the operation organs 26 and 27 for the adjustment of the objectives 5 and the object-plane 28 which is illuminated with lamps in the trays 29 and 30.

I claim:

1. Reproduction apparatus provided with at least two objectives mounted on or in a holder, which objectives are provided with an organ for the adjustment of the diaphragm aperture, and of which the holder can be displaced laterally and along the optical axis of the reproduction apparatus, respectively to select one of the objectives for the imagewise exposure of a light-sensitive material, and to bring the position of the selected objective in correspondence with the required reproduction factor, characterized in that the holder and the organs for the adjustment of the diaphragm are provided with one or more signal initiators and an element is installed near the holder, which can only be displaced along the optical axis together with the holder, and is provided with two series of detectors, whereby dependent on the objective selected, one of the detectors of the one series is caused to react to a signal initiator on the holder, and dependent on the diaphragm aperture selected one of the detectors of the other series is caused to react to a signal initiator of the corresponding organ for the adjustment of the diaphragm aperture.

2. Reproduction apparatus according to claim 1, characterized in that the signal initiators are magnets and that the detectors are Reed-contacts.

* * * * *